(12) United States Patent
Wang et al.

(10) Patent No.: US 12,279,193 B2
(45) Date of Patent: Apr. 15, 2025

(54) TERMINAL DEVICE INFLUENCED NETWORK SLICE SELECTION

(71) Applicant: Nokia Solutions and Networks Oy, Espoo (FI)

(72) Inventors: Zhi Wang, Shandong (CN); Yigang Cai, Naperville, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 247 days.

(21) Appl. No.: 17/596,679

(22) PCT Filed: Jun. 27, 2019

(86) PCT No.: PCT/CN2019/093252
§ 371 (c)(1),
(2) Date: Dec. 16, 2021

(87) PCT Pub. No.: WO2020/258151
PCT Pub. Date: Dec. 30, 2020

(65) Prior Publication Data
US 2022/0345862 A1 Oct. 27, 2022

(51) Int. Cl.
*H04L 67/303* (2022.01)
*H04W 4/50* (2018.01)
(Continued)

(52) U.S. Cl.
CPC ............... *H04W 4/50* (2018.02); *H04W 8/18* (2013.01); *H04W 48/18* (2013.01); *H04W 60/06* (2013.01)

(58) Field of Classification Search
CPC ......... H04W 4/50; H04W 8/18; H04W 48/18; H04W 60/06; H04L 67/303
See application file for complete search history.

(56) References Cited

U.S. PATENT DOCUMENTS

| 10,015,102 B2* | 7/2018 | Giaretta ................ H04L 43/062 |
| 2017/0332421 A1 | 11/2017 | Sternberg et al. |
| 2022/0022029 A1* | 1/2022 | Di Girolamo .......... H04W 4/50 |

FOREIGN PATENT DOCUMENTS

| CN | 107911850 A | 4/2018 |
| KR | 20160050586 A | 5/2016 |

(Continued)

OTHER PUBLICATIONS

"3rd Generation Partnership Project; Technical Specification Group Services and System Aspects; Study on Enhanced IMS to 5GC Integration (Release 16), 3GPP TR23.794 V1.0.0", Mar. 2019, 83 pages.

(Continued)

*Primary Examiner* — Joseph E Dean, Jr.
(74) *Attorney, Agent, or Firm* — McCarter & English LLP

(57) ABSTRACT

Embodiments of the disclosure provide a method, device and computer readable medium for terminal devices influenced network slice selection. According to embodiments of the present disclosure, a new terminal device influenced network slice selection is proposed. The NRF updates the application profile for the terminal device based on the change of the applications on the terminal device. The NRF may notify the PCF about the application profile and the PCF generates the route policy for the application on the terminal device. In this way, problems regarding the affected terminal devices of application influenced network slice selection are solved.

15 Claims, 8 Drawing Sheets

(51) Int. Cl.
H04W 8/18 (2009.01)
H04W 48/18 (2009.01)
H04W 60/06 (2009.01)

(56) References Cited

FOREIGN PATENT DOCUMENTS

WO WO-2018233808 A1 * 12/2018 ........ H04W 28/0215
WO WO-2023140704 A1 * 7/2023

OTHER PUBLICATIONS

"3rd Generation partnership Project; Technical Specification Group Services and System Aspects; System Architecture for the 5G System; Stage 2 (Release 15), 3GPP TS 23.501 V0.4.0", Apr. 2017, 124 pages.
"3GPP TS 23,502 V16.1.1, 3rd Generation Partnership Project; Technical Specification Group Services and System Aspects; Procedures for the 5G System; Stage 2 (Release 16)", Jun. 2019, 495 pages.
"3GPP TS 23.503, V16.1.0, 3rd Generation Partnership Project; Technical Specification Group Services and System Aspects; Policy and Charging Control Framework for the 5G System; Stage 2 (Release 16)", Jun. 2019, 99 pages.
Study on enhanced IP Multimedia Subsystem (IMS) to 5GC integration, 3GPP TR 23.794 V0.4.0, Jun. 15, 2018.
Study on enhanced IP Multimedia Subsystem (IMS) to 5GC integration, 3GPP TR 23.794 V0.5.0, Feb. 1, 2019.
Procedures for the 5G System (5GS), 3GPP TS 23.502 V15.4.1, Jan. 7, 2019.
Procedures for the 5G System (5GS), 3GPP TS 23.502 V16.0.2, Apr. 1, 2019.
Policy and charging control framework for the 5G System (5GS); Stage 2, 3GPP TS 23.503 V15.4.0, Dec. 18, 2018.
Policy and charging control framework for the 5G System (5GS); Stage 2, 3GPP TS 23.503 V16.0.0, Mar. 26, 2019.
System architecture for the 5G System (5GS), 33GP TS 23.501 V15.4.0, Dec. 18, 2018.

* cited by examiner

TERMINAL DEVICE INFLUENCED NETWORK SLICE SELECTION

CROSS REFERENCE TO RELATED APPLICATION

This patent application is a U.S. National Stage application of International Patent Application Number PCT/CN2019/093252 filed Jun. 27, 2019, which is hereby incorporated by reference in its entirety.

FIELD

Embodiments of the present disclosure generally relate to communication techniques, and more particularly, to methods, devices and computer readable medium for mobile device influenced network slice selection.

BACKGROUND

In recent communication systems, network slicing is a key technology to support very diverse range of services with very different performance requirements on a common physical infrastructure. It allows multiple virtual networks to be created on top of a common shared physical infrastructure. The virtual networks are then customized to meet the specific needs of applications, services, devices, customers or operators. Network slices may differ for supported features and network functions optimizations.

SUMMARY

Generally, embodiments of the present disclosure relate to a method for terminal device influenced network slice selection and the corresponding communication devices.

In a first aspect, embodiments of the disclosure provide a first device. The first device comprises: at least on processor; and a memory coupled to the at least one processor, the memory storing instructions therein, the instructions, when executed by the at least one processor, causing the first device to: receive, at the first device, first information indicating a change in an application related to a second device. The first device is also caused to update a profile for applications on the second device based on the first information, the profile associated with traffics of the applications on the second device. The first device is further caused to generate second information indicating at least a part of the updating of the profile. The first device is yet caused to transmit the second information to a third device for generating a route policy for the second device, the route policy specifying route selection for the applications on the second device.

In a second aspect, embodiments of the disclosure provide a third device. The third device comprises: at least on processor; and a memory coupled to the at least one processor, the memory storing instructions therein, the instructions, when executed by the at least one processor, causing the third device to receive, at the third device, information from a first device, the information indicating at least a part of updating of a profile for applications on a second device. The third device is also caused to generate a route policy for the second device, the profile associated with traffics of the applications on the second device. The third device is further caused to transmit the generated route policy to the second device.

In a third aspect, embodiments of the disclosure provide a fourth device. The fourth device comprises: at least on processor; and a memory coupled to the at least one processor, the memory storing instructions therein, the instructions, when executed by the at least one processor, causing the fourth device to generate, at the fourth device, a provision request associated with selecting network slice for an application, the provision request comprising an identity of the application. The fourth device is further caused to transmit the provision request to a first device.

In a fourth aspect, embodiments of the present disclosure provide a method. The method comprises receiving, at a first device, first information indicating a change in an application related to a second device. The method also comprises updating a profile for applications on the second device based on the first information, the profile associated with traffics of the applications on the second device. The method further comprises generating second information indicating at least a part of the updating of the profile. The method yet comprises transmitting the second information to a third device for generating a route policy for the second device, the route policy specifying route selection for the applications on the second device.

In a fifth aspect, embodiments of the present disclosure provide a method. The method comprises receiving, at a third device, information from a first device, the information indicating at least a part of updating of a profile for applications on a second device. The method also comprises generating a route policy for the second device, the profile associated with traffics of the applications on the second device. The method further comprises transmitting the generated route policy to the second device.

In a sixth aspect, embodiments of the present disclosure provide a method. The method comprises generating, at a fourth device, a provision request associated with selecting network slice for an application, the provision request comprising an identity of the application. The method further comprises transmitting the provision request to a first device.

In a seventh aspect, embodiments of the disclosure provide an apparatus. The apparatus comprises means for receiving, at a first device, first information indicating a change in an application related to a second device. The apparatus further comprises means for updating a profile for applications on the second device based on the first information, the profile associated with traffics of the applications on the second device. The apparatus also comprises means for generating second information indicating at least a part of the updating of the profile. The apparatus yet comprises means for transmitting the second information to a third device for generating a route policy for the second device, the route policy specifying route selection for the applications on the second device.

In an eighth aspect, embodiments of the disclosure provide an apparatus. The apparatus comprises means for receiving, at a third device, information from a first device, the information indicating at least a part of updating of a profile for applications on a second device. The apparatus further comprises means for generating a route policy for the second device, the profile associated with traffics of the applications on the second device. The apparatus also comprises means for transmitting the generated route policy to the second device.

In a ninth aspect, embodiments of the disclosure provide an apparatus. The apparatus comprises means for generating, at a fourth device, a provision request associated with selecting network slice for an application, the provision request comprising an identity of the application. The apparatus further comprises means for transmitting the provision request to a first device.

In a tenth aspect, embodiments of the disclosure provide a computer readable medium. The computer readable medium stores instructions thereon, the instructions, when executed by at least one processing unit of a machine, causing the machine to implement the method according to any of the fourth aspect, the fifth aspect or the sixth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
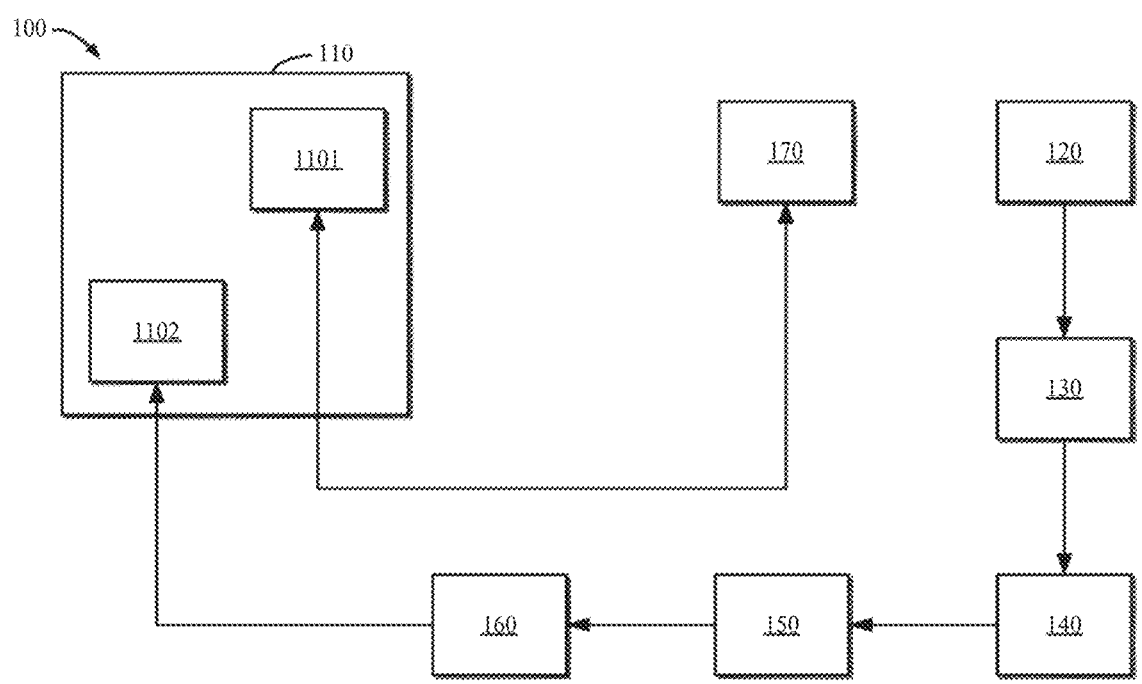
FIG. 1 illustrates a schematic diagram of a communication environment according to conventional technologies.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:
  (a) hardware-only circuit implementations (such as implementations in only analog and/or digital circuitry) and
  (b) combinations of hardware circuits and software, such as (as applicable):
  (i) a combination of analog and/or digital hardware circuit(s) with
  software/firmware and
  (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As discussed above, network slices may differ for supported features and network functions optimizations. Technical specifications of the 3$^{rd}$ generation partnership project (3GPP) define the network slicing solution in the fifth generation (5G) network already. Identification and selection of a Network Slice with the S-NSSAI (Single Network Slice Selection Assistance Information) and the NSSAI (Network Slice Selection Assistance Information) has been proposed already. Table 1 below shows 3 Slice/Service type (SST) supported so far.

TABLE 1

| Slice/Service type | SST value | Characteristics. |
|---|---|---|
| eMBB | 1 | Slice suitable for the handling of 5 G enhanced Mobile Broadband |
| URLLC | 2 | Slice suitable for the handling of ultra-reliable low latency communications. |
| MIoT | 3 | Slice suitable for the handling of massive IoT. |

With the introduction of network slicing technology in 5G network, a key issue for application domain is how an application can ensure a user or device with multiple 5G core (5GC) network slices and multiple application services to utilize the appropriate 5GC network slice for each application service and prevent inappropriate services been used from the incorrect 5GC network slice.

FIG. 1 illustrates a schematic diagram of a communication system 100. As shown in FIG. 1, the communication system 100 may comprise a terminal device 110, an Application Server/Application Function 120, a Network Exposure Function (NEF) 130, a Unified Data Management (UDM)/Unified Data Repository (UDR) 140, a policy control function (PCF) 150, an Access and Mobility Management Function (AMF) 160. The Application server may be a IP Multimedia Subsystem (IMS). The Application server may also be the AS/AF of internet provider, for example, facebook, youtube, wechat and the like. The terminal device 110 may also comprise the Application like IMS service module 1101 and the UE Route Selection Policy (URSP)/Network Slice Selection Policy (NSSP) module 1102. In some embodiments, the URSP may include NSSP. The URSP may also include the traffic routing rule in one network slices. It should be noted that the devices shown in FIG. 1 are only examples. The communication system 100 may also comprise other devices. The IMS-AS 120 may transmit a request for an application profile to the NEF 130. The NEF 130 may transmit a request for updating the profile to the UDM 140. The UDM 140 may create the NSSP for the application and notify the PCF 150 about the created NSSP. The PCF 150 may transmit the created NSSP to the terminal device 110 via the AMF 160.

However, how to determine the affected terminal devices is one key issue to prevent its commercial utilization. For the scenario that no terminal devices are included in the request between AF and 5GC, i.e., the request implicitly affects all terminal devices associated (for example, based on subscription) with the identified application provider, it requires the 5GC to maintain the mapping between the terminal devices and application provider. However, except some operator owned applications, the 5GC has no knowledge about the applications running on the terminal devices. How to setup such mapping is a technical question.

The scenario of including the external identity of a single terminal device (for example, Mobile Subscriber ISDN Number (MSISDN)), or the external identities of multiple terminal devices in the request between the AF and 5GC is also infeasible since the number of users/devices of an application is too huge in general to be included in one request message. Moreover, because dynamic change of the application on the terminal device (for example, install, uninstall, update), how to dynamic update its routing policy should also be considered.

According to embodiments of the present disclosure, a new terminal device influenced network slice selection is proposed. The NRF updates the application profile for the terminal device based on the change of the applications on the terminal device. The NRF may notify the PCF about the application profile and the PCF generates the route policy for the application on the terminal device. In this way, problems regarding the affected terminal devices of application influenced network slice selection are solved. Further, embodiments of the present disclosure can also help on routing for applications.

Figure 2:
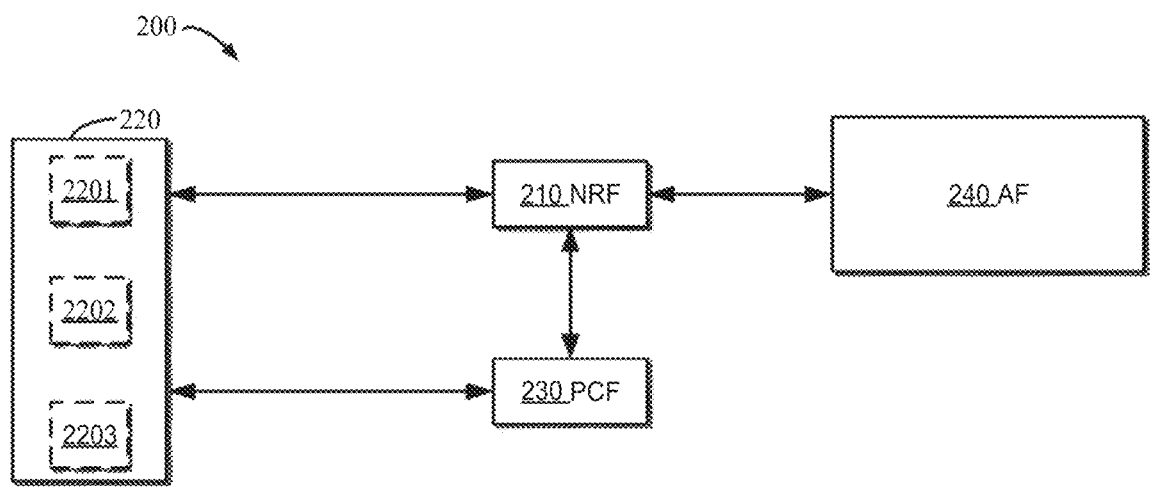
FIG. 2 illustrates a schematic diagram of a communication system according to embodiments of the present disclosure.

FIG. 2 illustrates a schematic diagram of a communication system 200 in which embodiments of the present disclosure can be implemented. As shown in FIG. 2, the communication system 200 may comprise a NRF 210, a terminal device 220, a PCF 230 and an Application Function (AF) 240. As shown in FIG. 2, there may be some applications 2201, 2202 and 2202. The application can be installed on the terminal device 220. The number of applications shown in FIG. 2 is only an example, not a limitation. It should be noted that the communication system 200 may comprise an Application Server instead of the AF.

It should be noted that the NRF 210, the PCF 230 and the Application Function 240 may be implemented at any suitable devices, entities or modules. It should be noted that the devices, modules, or entities shown in FIG. 2 are only examples. It should be understood that the communication system 200 may also comprise other elements which are omitted for the purpose of clarity. It is to be understood that the numbers of devices, modules, or entities shown in FIG. 2 are given for the purpose of illustration without suggesting any limitations.

Communications in the communication system 200 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 3:
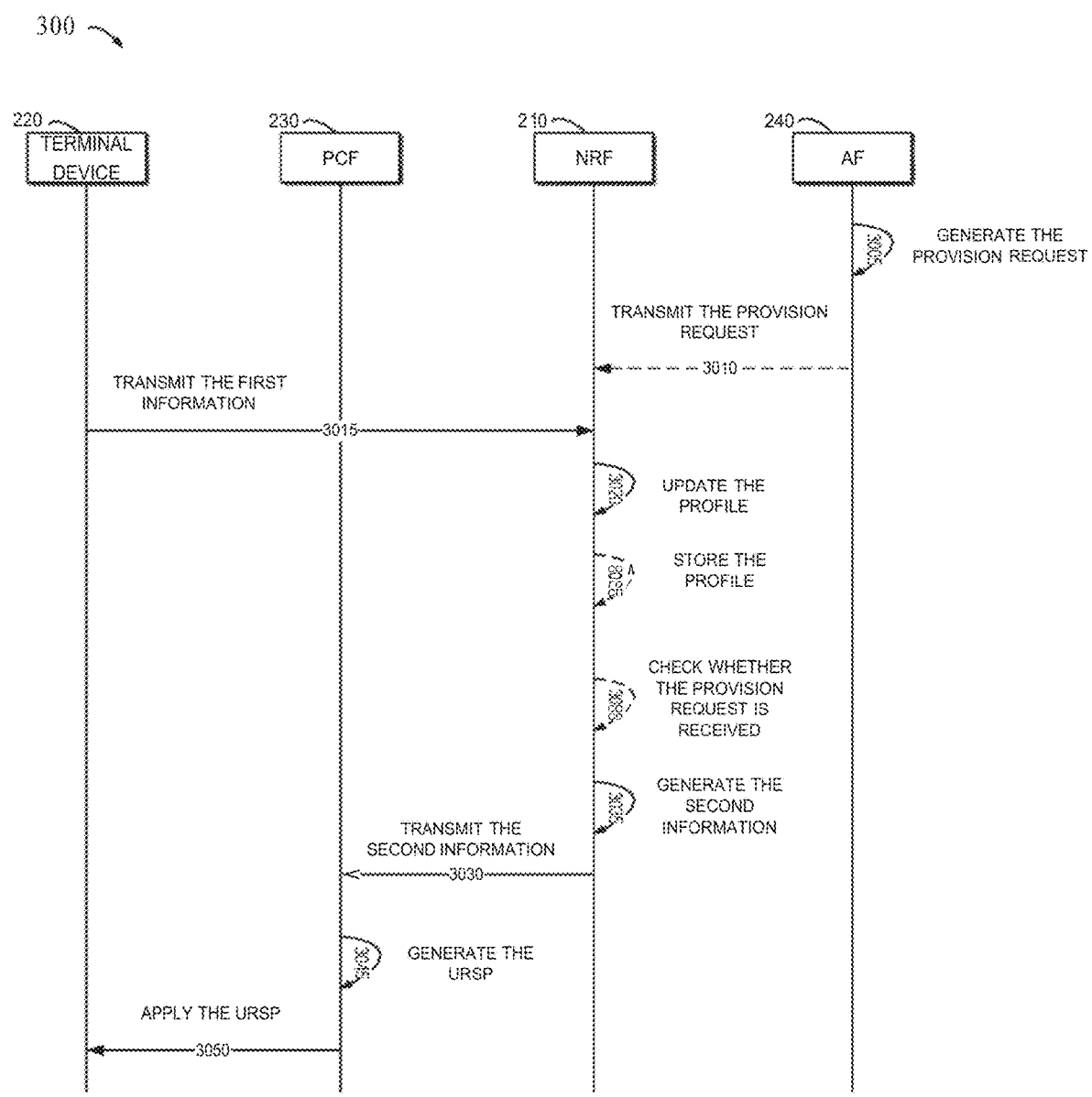
FIG. 3 illustrates a schematic diagram of interactions among devices according to embodiments of the present disclosure.

FIG. 3 illustrates a schematic diagram of interactions 300 in accordance with embodiments of the present disclosure. The interactions 300 may be implemented at any suitable devices. Only for the purpose of illustrations, the interactions 300 are described to be implemented among the NRF 210, the terminal device 220, the PCF 230 and the Application Function 240.

The NRF 210 obtains first information indicating the change in the application related to the terminal device 220. In some embodiments, the terminal device 220 may transmit 3005 the first information to the NRF 210. Alternatively, the first information may be transmitted by other entity, for example, the application provider.

In an example embodiment, the first information may comprise a request for registering the application on the terminal device. The request may be transmitted to the NRF 210 to register the application (for example, the application 2201) on the terminal device 220. The first information may comprise the identity of the terminal device 220 which uniquely indicate the terminal device 220 in the network. The first information may also comprise the identity of the application 2201 which uniquely indicate the application 2201. Alternatively or in addition, the first information may comprise additional information. For example, the first information may comprise one or more of: the traffic type of the application 2201, the application provider, the application user indicator, the location of the terminal device 220 or software version on the terminal device 220.

In other example embodiment, the first information may comprise a request for deregistering the application on the terminal device 220. The request may be transmitted to the NRF 210 to deregister the application (for example, the application 2202) on the terminal device 220. The first information may comprise the identity of the terminal device 220 which uniquely indicate the terminal device 220 in the network. The first information may also comprise the identity of the application 2202 which uniquely indicate the application 2202. Alternatively or in addition, the first information may comprise additional information. For example, the first information may comprise one or more of: the traffic type of the application, the application provider, the application user indicator, the location of the terminal device 220 or software version on the terminal device 220.

In another example embodiment, the first information may comprise a request for updating the application on the terminal device 220. The request may be transmitted to the NRF 210 to update the application (for example, the application 2203) on the terminal device 220. The first information may comprise the identity of the terminal device 220 which uniquely indicate the terminal device 220 in the network. The first information may also comprise the identity of the application 2203 which uniquely indicate the application 2203. Alternatively or in addition, the first information may comprise additional information. For example, the first information may comprise one or more of: the traffic type of the application, the application provider, the application user indicator, the location of the terminal device 220 or software version on the terminal device 220.

In some embodiments, there may be a new interface between the NRF 210 and the terminal device 220 to support to transmit the first information. In some embodiment, there may be two ways to implement above new interface between the NRF 210 and the terminal device 220. The first one is to connect NRF 210 and UE Application through NEF (i.e. Terminal Device-NEF-NRF) and another one is through AMF (i.e. Terminal Device-AMF-NRF). In some embodiments, conventional NRF procedures, such as NF service Registration, NF service update, and NF service deregistration are reused for the registration, update and deregistration of application running on the terminal device 220. The transmission of the first information may be triggered when an application is installed/update/uninstalled on the terminal device 220.

The AF 240 generates 3010 the provision request. The provision request is for AF to influence application route selection including network slice selection. Table 2 below shows the provision request. It should be noted that Table 2 is only an example.

TABLE 2

| Service Name | Service Operations | Operation Semantics | Example Consumer(s) |
| --- | --- | --- | --- |
| Nnrf_UEAPPProvision | Update | Request/Response | AF |

The provision request comprises the identity of the application which uniquely indicates the application. The AF 240 may generate a route operation and a condition for applying the route operation. For example, the provision request may also comprise Application Route Selection Policy defined by the AF 240. This Application Route Selection Policy is a set of traffic route rules which composed by rule criteria and rule operations. The rule operation may indicate the route operation when the rule criteria are met. The operation may be either implicit with the QoS profile (for example, QoS requirement like Delay<20 ms) or explicit to nominate the network slice ID. In the case that the application user indicator is provided in application register to the NRF 210, the criteria of Application Route Selection Policy can also include the application user indicator, which enables the AF 240 instruct network to provide different service to different application user.

The condition of applying related operation may be one or more of: the location of the terminal device, time, traffic type (for example, video, voice, message), a Flow ID, i.e. any information that can be used to differentiate one data flow, or Network conditions (for example, network (slice) working load, Network usage, charging rate). Table 3 shows an example of the policy. It should be noted that the contents in Table 3 are only examples.

TABLE 3

| Rule ID | Criteria | Operation | Note |
| --- | --- | --- | --- |
| #1 | Traffic type = Voice | Specific QoS profile | In this case, network will select appropriate routing (network slice) base on given QoS profile |
| #2 | Traffic type = Video && specific time range | Identification of a Network Slice | In this case, network will select AF appointed routing (network slice) |
| #3 | Traffic type = Message | No Slice Selection | In this case, don't notify PCF |

The AF 240 transmits 3015 the provision request to the NRF 210. In some embodiments, the AF 240 may generate and transmit the prevision request before the terminal device 220 transmits the first information to the NRF210. Alternatively, the AF 240 may generate and transmit the prevision request after the terminal device 220 transmits the first information to the NRF 210.

The NRF 210 updates 3020 a profile for applications on the terminal device 220 based on the first information. In some embodiments, the NRF 210 may determine whether the profile exists. If the profile does not exist, the NRF 210 may generate the profile. If the profile exists, the NRF 210 may update the profile based on the first information. Table 4 below shows the profile for the applications on the terminal device 220. It should be noted that the contents in Table 4 are only examples, not limitations.

TABLE 4

| UE ID | UE APP ID | Application additional info |
|---|---|---|
| 220 | 2201 | Traffic type = Video |
| 220 | 2201 | Traffic type = Message |

The profile enables the network to track the Application status on specific terminal devices. In this way, it helps the network to provide accurate and efficient service controlling base on Application specific needs. In some embodiments, the NRF 210 may store the profile locally. Alternatively or in addition, the NRF 210 may store the profile in a database.

The NRF 210 generates 3035 the second information based on the profile. In some embodiments, the NRF 210 may check 3030 whether the provision request is received from the AF 240. If the provision request is received, the NRF 210 may generate the second information based on the profile and the proviso request. Once provision request is received from the AF 240, the NRF 210 may check the profile of the terminal device 220 to determine whether the application indicated in the provision request exist in the profile. If the application doesn't exist which means the application has not registered from the terminal device 220, the NRF 210 may store the provision request.

Alternatively, if the application exists in the profile of the terminal device 220, the NRF 210 may generate the second information based on the profile and the provision request. For example, the second information may comprise the profile and the Application Route Selection Policy (for example, Table 3). In other embodiments, if the provision request shows "Traffic type=Message" will not be notified to PCF, the NRF 210 may not generate the second information if the traffic type of the application is message.

If the provision request is not received, the NRF 210 may generate the second information based on the profile and the subscription of the PCF 230. The subscription may indicate the applications that the PCF 230 subscribes. The NRF 210 transmits 3040 the second information to the PCF 230.

The PCF 230 generates 3045 the route policy for the terminal device 220 based on the second information. The route policy may be a UE Route Selection Policy (URSP). In some embodiments, the PCF 230 may generate the route policy for each application on the terminal device 220. Alternatively, the PCF 230 may generate the route policy for a specific traffic of one application on the terminal device 220. The PCF 230 applies 3050 the route policy to the network 200. In this way, the route policy may be generated with the consideration of the applications on the terminal devices.

Figure 4:
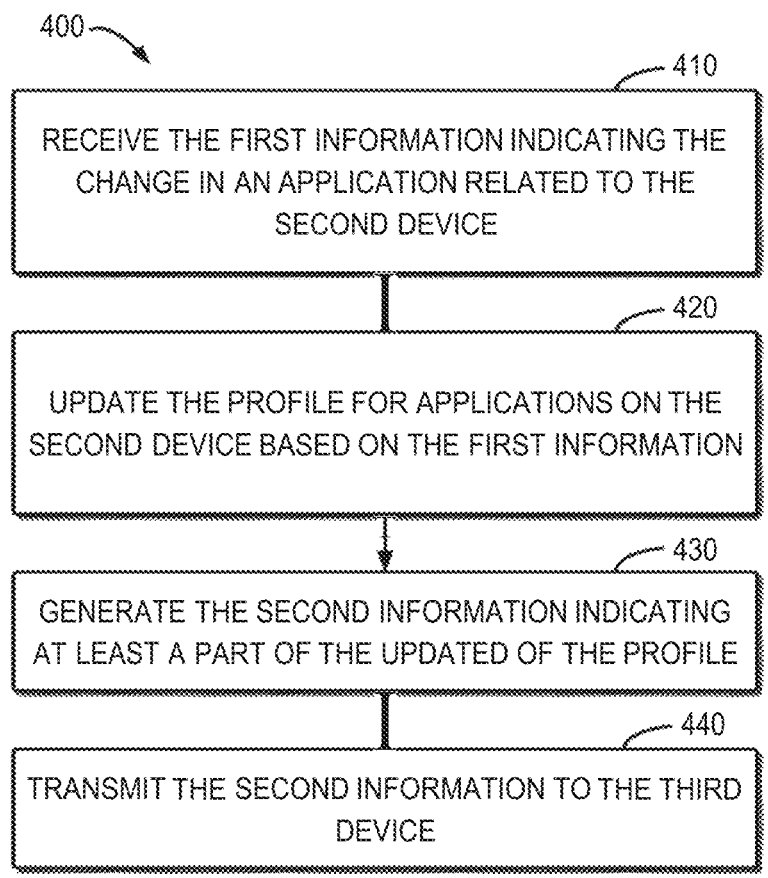
FIG. 4 illustrates a flow chart of a method implemented at a communication device according to embodiments of the present disclosure.

FIG. 4 illustrates a flow chart of a method 400 in accordance with embodiments of the present disclosure. The method 400 may be implemented at any suitable devices. Only for the purpose of illustrations, the method 400 is described to be implemented at the NRF 210.

At block 410, the NRF 210 receives the first information indicating the change in the application related to the terminal device 220. In some embodiments, the terminal device 220 may transmit the first information to the NRF 210. Alternatively, the first information may be transmitted by other entity, for example, the application provider.

In an example embodiment, the first information may comprise a request for registering the application on the terminal device 220. The request may be transmitted to the NRF 210 to register the application (for example, the application 2201) on the terminal device 220. The first information may comprise the identity of the terminal device 220 which uniquely indicate the terminal device 220 in the network. The first information may also comprise the identity of the application 2201 which uniquely indicate the application 2201. Alternatively or in addition, the first information may comprise additional information. For example, the first information may comprise one or more of: the traffic type of the application 2201, the application provider, the application user indicator, the location of the terminal device 220 or software version on the terminal device 220.

In other example embodiment, the first information may comprise a request for deregistering the application on the terminal device 220. The request may be transmitted to the NRF 210 to deregister the application (for example, the application 2202) on the terminal device 220. The first information may comprise the identity of the terminal device 220 which uniquely indicate the terminal device 220 in the network. The first information may also comprise the identity of the application 2202 which uniquely indicate the application 2202. Alternatively or in addition, the first information may comprise additional information. For example, the first information may comprise one or more of: the traffic type of the application, the application provider, the application user indicator, the location of the terminal device 220 or software version on the terminal device 220.

In a further example embodiment, the first information may comprise a request for updating the application on the terminal device 220. The request may be transmitted to the NRF 210 to update the application (for example, the application 2203) on the terminal device 220. The first information may comprise the identity of the terminal device 220 which uniquely indicate the terminal device 220 in the network. The first information may also comprise the identity of the application 2203 which uniquely indicate the application 2203. Alternatively or in addition, the first information may comprise additional information. For example, the first information may comprise one or more of: the traffic type of the application, the application provider, the application user indicator, the location of the terminal device 220 or software version on the terminal device 220.

In some embodiments, there may be a new interface between the NRF 210 and the terminal device 220 to support to transmit the first information. In some embodiment, there may be two ways to implement above new interface between the NRF 210 and the terminal device 220. The first one is to connect NRF 210 and UE Application through NEF (i.e. Terminal Device-NEF-NRF) and another one is through AMF (i.e. Terminal Device-AMF-NRF). In some embodiments, conventional NRF procedures, such as NF service Registration, NF service update, and NF service deregistration are reused for the registration, update and deregistration of application running on the terminal device 220. The transmission of the first information may be triggered when an application is installed/update/uninstalled on the terminal device 220.

At block 420, the NRF 210 updates the profile for applications on the terminal device 220 based on the first information. In some embodiments, the NRF 210 may determine whether the profile exists. If the profile does not exist, the NRF 210 may generate the profile. If the profile exists, the NRF 210 may update the profile based on the first information.

The profile enables the network to track the Application status on specific terminal devices. In this way, it helps the network to provide accurate and efficient service controlling base on Application specific needs. In some embodiments, the NRF 210 may store the profile locally. Alternatively or in addition, the NRF 210 may store the profile in a database.

At block 430, the NRF 210 generates the second information based on the profile. In some embodiments, the NRF 210 may check 3030 whether the provision request is received from the AF 240. If the provision request is received, the NRF 210 may generate the second information based on the profile and the proviso request. Once provision request is received from the AF 240, the NRF 210 may check the profile of the terminal device 220 to determine whether the application indicated in the provision request exist in the profile. If the application doesn't exist which means the application has not registered from the terminal device 220, the NRF 210 may store the provision request.

Alternatively, if the application exists in the profile of the terminal device 220, the NRF 210 may generate the second information based on the profile and the proviso request. For example, the second information may comprise the profile and the Application Route Selection Policy (for example, Table 3). In other embodiments, if the provision request shows "Traffic type=Message" will not be notified to PCF, the NRF 210 may not generate the second information if the traffic type of the application is message.

If the provision request is not received, the NRF 210 may generate the second information based on the profile and the subscription of the PCF 230. The subscription may indicate the applications that the PCF 230 subscribes.

At block 440, the NRF 210 transmits the second information to the PCF 230. The route policy specifies route selection for the applications on the terminal device 220. In this way, the route policy may be generated with the consideration of the applications on the terminal devices.

Figure 5:
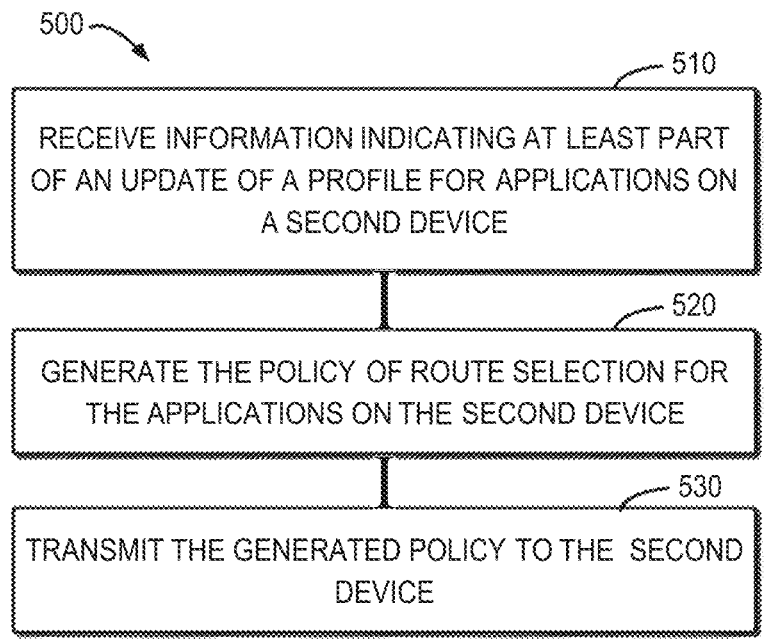
FIG. 5 illustrates a flow chart of a method implemented at a communication device according to embodiments of the present disclosure.

FIG. 5 illustrates a flow chart of a method 500 in accordance with embodiments of the present disclosure. The method 500 may be implemented at any suitable devices. Only for the purpose of illustrations, the method 500 is described to be implemented at the PCF 230.

At block 510, the PCF 230 receive the second information from the NRF 210. For example, the second information may comprise the profile and the Application Route Selection Policy (for example, Table 3). If the provision request is not received the second information may be generated based on the profile and the subscription of the PCF 230. Alternatively, the second information may be generated based on the profile and the provision request.

At block 520, the PCF 230 generates the route policy for the terminal device 220 based on the second information. The route policy may be a UE Route Selection Policy (URSP). In some embodiments, the PCF 230 may generate the route policy for each application on the terminal device 220. Alternatively, the PCF 230 may generate the route policy for a specific traffic of one application on the terminal device 220. The PCF 230 applies 3050 the route policy to the network 200. In this way, the route policy may be generated with the consideration of the applications on the terminal devices.

At block 530, the PCF 230 transmits the route policy to the terminal device 220. In this way, the route policy may be generated with the consideration of the applications on the terminal devices.

Figure 6:
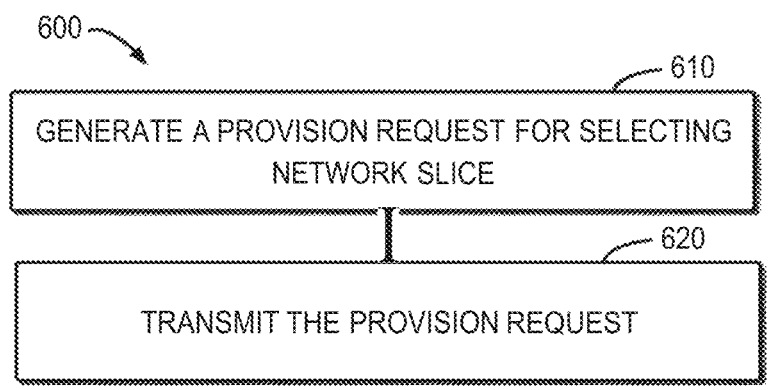
FIG. 6 illustrates a flow chart of a method implemented at a communication device according to embodiments of the present disclosure.

FIG. 6 illustrates a flow chart of a method 600 in accordance with embodiments of the present disclosure. The method 600 may be implemented at any suitable devices. Only for the purpose of illustrations, the method 600 is described to be implemented at the AF 240.

At block 610, the AF 240 generates the provision request. The provision request is for AF to influence application route selection including network slice selection. The provision request comprises the identity of the application which uniquely indicates the application.

In some embodiments, the AF 240 may generate a route operation and a condition for applying the route operation and combine the operations with the condition as a part of the provision request. For example, the provision request may also comprise Application Route Selection Policy defined by the AF 240. This Application Route Selection Policy is a set of traffic route rules which composed by rule criteria and rule operations. The rule operation may indicate the route operation when the rule criteria are met. The operation may be either implicit with the QoS profile (for example, QoS requirement like Delay<20 ms) or explicit to nominate the network slice ID.

In some embodiments, the condition of applying related operation may be one or more of: the location of the terminal device, time, traffic type (for example, video, voice, message), a Flow ID, i.e. any information that can be used to differentiate one data flow, or Network conditions (for example, network (slice) working load, Network usage, charging rate).

At block 620, the AF 240 transmits the provision request to the NRF 210. In some embodiments, the AF 240 may generate and transmit the prevision request before the terminal device 220 transmits the first information to the NRF210. Alternatively, the AF 240 may generate and transmit the prevision request after the terminal device 220 transmits the first information to the NRF 210.

In some embodiments, an apparatus for performing the method 400 (for example, the NRF 210) may comprise respective means for performing the corresponding steps in the method 400. These means may be implemented in any suitable manners. For example, it can be implemented by circuitry or software modules.

In some embodiments, the apparatus comprises means for receiving, at a first device, first information indicating a change in an application related to a second device; means for updating a profile for applications on the second device based on the first information, the profile associated with traffics of the applications on the second device; means for generating second information indicating at least a part of the updating of the profile; and means for transmitting the second information to a third device for generating a route policy for the second device, the route policy specifying route selection for the applications on the second device.

In some embodiments, the first information comprises at least one of the following: a request for registering the application on the second device, a request for deregistering the application on the second device, or a request for updating the application.

In some embodiments, the first information comprises at least one of the following: an identity of the second device, or an identity of the application.

In some embodiments, the means for updating the profile for applications on the second device comprise: means for determining whether the profile is present; means for in response to a determination of absence of the profile, generating the profile for applications on the second device; and means for storing the generated profile.

In some embodiments, the means for generating the second information comprises: means for determining whether a provision request has been received from a fourth device, the provision request comprising an identity of the application, the provision request associated with selecting a network slice for the application; and means for in response to a determination that the provision request has been received, generating the second information based on the provision request and the profile.

In some embodiments, the means for generating the second information comprises: means for determining whether a provision request has been received from a fourth device, the provision request comprising an identity of the application, the provision request associated with selecting a network slice for the application; and means for in response to a determination of absence of the provision request, generating the second information based on subscription of the third device and the profile.

In some embodiments, the first device is a Network Repository Function, NRF, device, the second device is a terminal device, the third device is a policy control device.

In some embodiments, an apparatus for performing the method 500 (for example, the PCF 230) may comprise respective means for performing the corresponding steps in the method 500. These means may be implemented in any suitable manners. For example, it can be implemented by circuitry or software modules.

In some embodiments, the apparatus comprises means for receiving, at a third device, information from a first device, the information indicating at least a part of updating of a profile for applications on a second device; means for generating a route policy for the second device, the profile associated with traffics of the applications on the second device; and means for transmitting the generated route policy to the second device.

In some embodiments, the means for generating the policy of route selection for the second device comprises: means for generating the route policy for each application on the second device.

In some embodiments, the means for generating the policy of route selection for the second device comprises: means for generating the route policy for traffic of one application on the second device.

In some embodiments, the first device is a Network Repository Function, NRF, device, the second device is a terminal device, the third device is a policy control device.

In some embodiments, an apparatus for performing the method 600 (for example, the AF 240) may comprise respective means for performing the corresponding steps in the method 600. These means may be implemented in any suitable manners. For example, it can be implemented by circuitry or software modules.

In some embodiments, the apparatus comprises means for generating, at a fourth device, a provision request associated with selecting network slice for an application, the provision request comprising an identity of the application; and means for transmitting the provision request to a first device.

In some embodiments, the means for generating the provision request comprises: means for generating a route operation; means for generating a condition for applying the route operation; and means for combining the route operation and the condition as a part of the provision request.

In some embodiments, the condition comprises at least one of the following: a location of a second device, a traffic type used by the second device, a flow ID, or a network condition.

In some embodiments, the first device is a Network Repository Function, NRF, device, the second device is a terminal device, the fourth device is an Application Function, AF, device.

Figure 7:
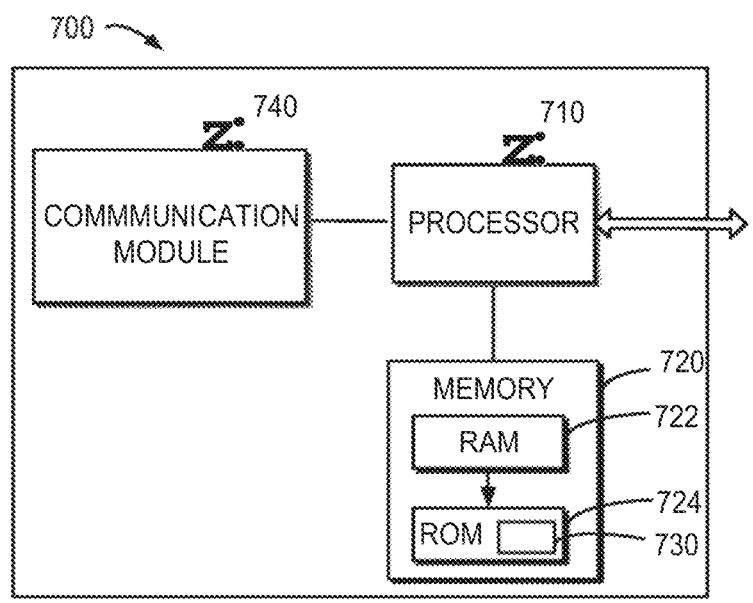
FIG. 7 illustrates a schematic diagram of a device according to embodiments of the present disclosure.

FIG. 7 is a simplified block diagram of a device 700 that is suitable for implementing embodiments of the present disclosure. The device 700 may be provided to implement the communication devices as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 3 to 6. The embodiments of the present disclosure may also be implemented by hardware or by a combination of software and hardware.

Figure 8:
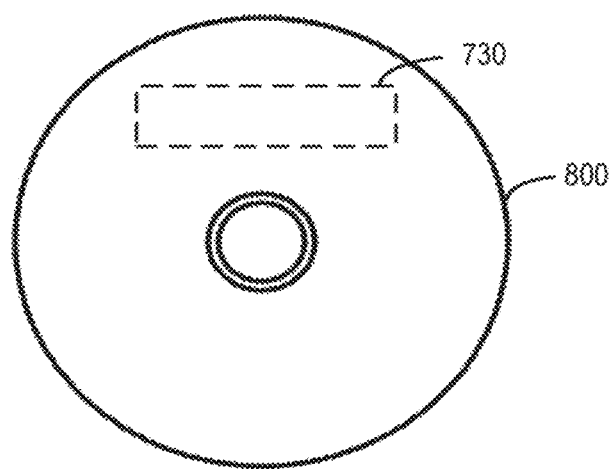
FIG. 8 shows a block diagram of an example computer readable medium in accordance with some embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 as described above with reference to FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
 at least one processor; and
 at least one memory storing instructions that, when executed by the at least one processor, cause the first device to:
  receive, at the first device, first information indicating a change in an application related to a second device;
  update a profile, for applications on the second device, based on the first information, the profile associated with traffics of the applications on the second device;
  generate second information indicating at least a part of the updating of the profile; and
  transmit the second information to a third device, where the second information is configured to be used for generating a route policy for the second device, the route policy being configured for specifying route selection for the applications on the second device.

2. The first device of claim 1, wherein the first information comprises at least one of the following:
a request for registering the application on the second device,
a request for deregistering the application on the second device, or
a request for updating the application.

3. The first device of claim 1, wherein the first information comprises at least one of the following:
an identity of the second device, or
an identity of the application.

4. The first device of claim 1, wherein the instructions are configured to, when executed by the at least one processor, cause the first device to update the profile for applications on the second device with:
determining whether the profile is present;
in response to a determination of absence of the profile, generating the profile for applications on the second device; and
storing the generated profile.

5. The first device of claim 1, wherein the instructions are configured to, when executed by the at least one processor, cause the first device to generate the second information by:
determining whether a provision request has been received from a fourth device, the provision request comprising an identity of the application, the provision request associated with selecting a network slice for the application, where the fourth device comprises an application function; and
in response to a determination that the provision request has been received, generating the second information based on the provision request and the profile.

6. The first device of claim 1, wherein the instructions are configured to, when executed by the at least one processor, cause the first device to generate the second information by:
determining whether a provision request has been received from a fourth device, the provision request comprising an identity of the application, the provision request associated with selecting a network slice for the application, where the fourth device comprises an application function; and
in response to a determination of absence of the provision request, generating the second information based on subscription of the third device and the profile.

7. The first device of claim 1, wherein the first device is a network repository function (NRF) device, the second device is a terminal device, the third device is a policy control device.

8. A method comprising:
receiving, at a first device, first information indicating a change in an application related to a second device;
updating a profile based on the first information, where the profile is configured to be used for applications on the second device, the profile associated with traffics of the applications on the second device;
generating second information indicating at least a part of the updating of the profile; and
transmitting the second information to a third device, where the second information is configured to be used for generating a route policy for the second device, the route policy being configured for specifying route selection for the applications on the second device.

9. The method of claim 8, wherein the first information comprises at least one of the following:
a request for registering the application on the second device,
a request for deregistering the application on the second device, or
a request for updating the application.

10. The method of claim 8, wherein the first information comprises at least one of the following:
an identity of the second device, or
an identity of the application.

11. The method of claim 8, wherein the updating of the profile comprises:
determining whether the profile is present;
in response to a determination of absence of the profile, generating the profile for applications on the second device; and
storing the generated profile.

12. The method of claim 8, wherein generating the second information comprises:
determining whether a provision request has been received from a fourth device, the provision request comprising an identity of the application, the provision request associated with selecting a network slice for the application, where the fourth device comprises an application function; and
in response to a determination that the provision request has been received, generating the second information based on the provision request and the profile.

13. The method of claim 8, wherein generating the second information comprises:
determining whether a provision request has been received from a fourth device, the provision request comprising an identity of the application, the provision request associated with selecting a network slice for the application, where the fourth device comprises an application function; and
in response to a determination of absence of the provision request, generating the second information based on subscription of the third device and the profile.

14. The method of claim 8, wherein the first device is a network repository function device, the second device is a terminal device, the third device is a policy control device.

15. A non-transitory computer readable medium storing instructions thereon, the instructions, when executed by at least one processing unit of a machine, causing the machine:
receive, at the machine, first information indicating a change in an application related to a second device;
update a profile based on the first information, where the profile is configured to be used for applications on the second device, the profile associated with traffics of the applications on the second device;
generate second information indicating at least a part of the updating of the profile; and
transmit the second information to a third device, where the second information is configured for generating a route policy for the second device, the route policy being configured for specifying route selection for the applications on the second device.

\* \* \* \* \*